Patented Sept. 13, 1938

2,130,031

UNITED STATES PATENT OFFICE 2,130,031

DYESTUFF INTERMEDIATES OF THE ANTHRAQUINONE SERIES

William L. Rintelman, Carrollville, Wis., assignor to E. I. du Pont de Nemours & Company, Wilmington, Del., a corporation of Delaware No Drawing. Application November 25, 1936, Serial No. 112,705

2 Claims. (Cl. 260—44)

This invention relates to the preparation of new and valuable dyestuff intermediates of the anthraquinone series and more particularly to the preparation of new C-aryl-1,2-anthraquinonethiazoles and oxazoles of the general formula

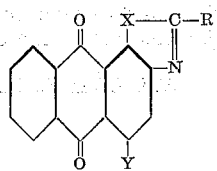

wherein X stands for sulfur or oxygen, Y stands for chlorine or bromine and R stands for an aryl radical of the benzene, naphthalene or anthraquinone series.

I have found that new and valuable dyestuff intermediates can be prepared from 3-amino-4-halogen-C-aryl-1,2-anthraquinonethiazoles and oxazoles by diazotizing and removing the amino group by the Sandmeyer reaction, and that the resulting 4-halogeno-C-aryl-1,2-anthraquinonethiazoles and oxazoles serve as valuable intermediates for the preparation of dyestuffs. The diazotization and removal of the amino group by the Sandmeyer reaction has been found to take place readily giving the 4-halogen-C-aryl-1,2-anthraquinoneazoles.

The following examples are given to more fully illustrate the invention. The parts used are by weight.

Example 1

25 parts 3-amino-4-chloro-C-phenyl-1,2-anthraquinonethiazole are dissolved in 250 parts 95% sulfuric acid and cooled to 10–15° C. 5 parts sodium nitrite are slowly added, the temperature being maintained at 10–15° C. The solution is stirred 1 hour longer, or until diazotization is complete. (When complete, the diazonium sulfate precipitates in yellow-brown flocks when drowned in water.) The acid solution is then slowly poured into 1000 parts water (cold) containing 250 parts ethyl alcohol, a suspension of cupric oxide (made by dissolving 32 parts hydrated copper sulfate and 40 parts sodium chloride in 250 parts water, reducing with gaseous sulfur trioxide until the color of the solution is straw colored and neutralizing with sodium carbonate) is added as rapidly as possible. When the addition is complete, the suspension is heated to a boil and held 1 hour, filtered, washed acid-free and dried. The crude product may be purified by dissolving in 10 parts of hot nitrobenzene from which it precipitates on cooling in long yellow-brown needles melting at 294–296° C. It forms a yellow solution in concentrated sulfuric acid. It is slightly soluble in cold nitrobenzene with a deep yellow coloration which gets redder on adding anhydrous aluminum chloride.

The 4-bromo-C-phenyl-1,2-anthaquinonethiazole may be made in an analogous manner from the corresponding bromo-aminoanthraquinonethiazole. It crystallizes from hot nitrobenzene in yellow-brown crystals having a melting point of 263.5–268.5° C.

The 4-bromo-C-phenyl-1,2-anthraquinoneoxazole is also made in this manner using the corresponding 4-bromo-3-amino-C-phenyl-1,2-anthraquinoneoxazole. It crystallizes from nitrobenzene in slender pale yellow needles with a melting range of 269–272° C. It dissolves in concentrated sulfuric acid with a yellow color and vats to a yellowish red colored vat.

These new 4-halogen-anthraquinoneoxazoles are valuable in the preparation of dyestuffs.

From the 4-halogen-C-aryl-1,2-anthraquinonethiazoles and oxazoles the corresponding 4-amino compounds may be readily prepared in good yields, as illustrated by the following example:

Example 2

112 parts of 4-bromo-C-phenyl-1,2-anthraquinonethiazole are dissolved in a mixture of 550 parts of molten naphthalene, 50 parts of potassium carbonate, 65 parts of p-toluene-sulfonamide and 2.6 parts of copper bronze. The mass is heated to 205° C. and held for 8 hours. The product is isolated by diluting in 1000 parts of o-dichlorobenzene and filtering at 150° C. It is washed free of solvents and salts with alcohol and water and dried.

The 4-p-toluenesulfonamide-C-phenyl-1,2-anthraquinonethiazole is a bluish red crystalline product which is insoluble in hot nitrobenzene. These red crystals are no doubt the potassium salt of the amide. The free amide is yellow in color and is obtained by treating the red crystals with acid. If anhydrous aluminum chloride is added to the cold nitrobenzene suspension, a pale yellow solution is formed. The product dissolves in strong sulfuric acid with a yellow coloration. It may be hydrolyzed to the free amino compound by dissolving in 95% sulfuric acid and warming to 100° C. for a few minutes.

The corresponding 4-p-toluido-C-phenyl-1,2-anthraquinoneoxazole forms orange needles from cold nitrobenzene. They dissolve in sulfuric acid with a yellow color and are slightly soluble in hot nitrobenzene with a reddish coloration.

The free 4-amino-C-phenyl-1,2-anthraquinonethiazole obtained by hydrolysis as mentioned above crystallizes from nitrobenzene in purple needles which are not melted at 330° C. It forms a bluish red vat with alkaline hydrosulfite. When treated with benzoyl chloride in hot nitrobenzene, a yellow dyestuff is formed.

The 4-amino-C-phenyl-1,2-anthraquinoneoxazole obtained in this manner is a red amorphous compound. It dissolves in hot nitrobenzene with an orange coloration from which it is deposited on cooling in red needles which dissolve in sulfuric acid with a yellow-brown color. With alkaline hydrosulfite it forms a wine colored vat.

The 3-amino-4-halogen-C-naphthyl-(or anthraquinonyl)-1,2-anthraquinonethiazoles and oxazoles may be substituted for the phenylanthraquinonethiazoles in the above examples.

The 3-amino-4-halogen-C-aryl-1,2-anthraquinonethiazoles and oxazoles may be prepared by the process more fully described in my copending application Serial No. 112,704, from the 3-halogen-C-aryl-1,2-anthraquinonethiazoles and oxazoles, by amidation with p-toluenesulfonamide and with subsequent hydrolysis and bromination.

I claim:

1. The new C-aryl-1,2-anthraquinonethiazoles and oxazoles of the formula

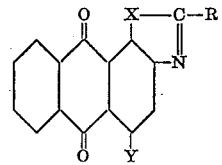

wherein X stands for an element of the class consisting of sulfur and oxygen, Y stands for an element of the class consisting of chlorine and bromine and R stands for a radical of the class consisting of those of the benzene, anthracene and anthraquinone series.

2. The new C-phenyl-1,2-anthraquinonethiazoles and oxazoles of the formula

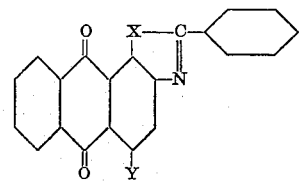

wherein X stands for an element of the class consisting of sulfur and oxygen and Y stands for an element of the class consisting of chlorine and bromine.

WILLIAM L. RINTELMAN.